March 1, 1938.  A. C. LINDGREN ET AL  2,109,669
PLOW ATTACHMENT FOR TRACTORS
Filed May 9, 1936   3 Sheets-Sheet 2

Inventors
Aletus C. Lindgren
James Morkovski
By [signature]
Atty.

March 1, 1938.  A. C. LINDGREN ET AL  2,109,669
PLOW ATTACHMENT FOR TRACTORS
Filed May 9, 1936   3 Sheets-Sheet 3
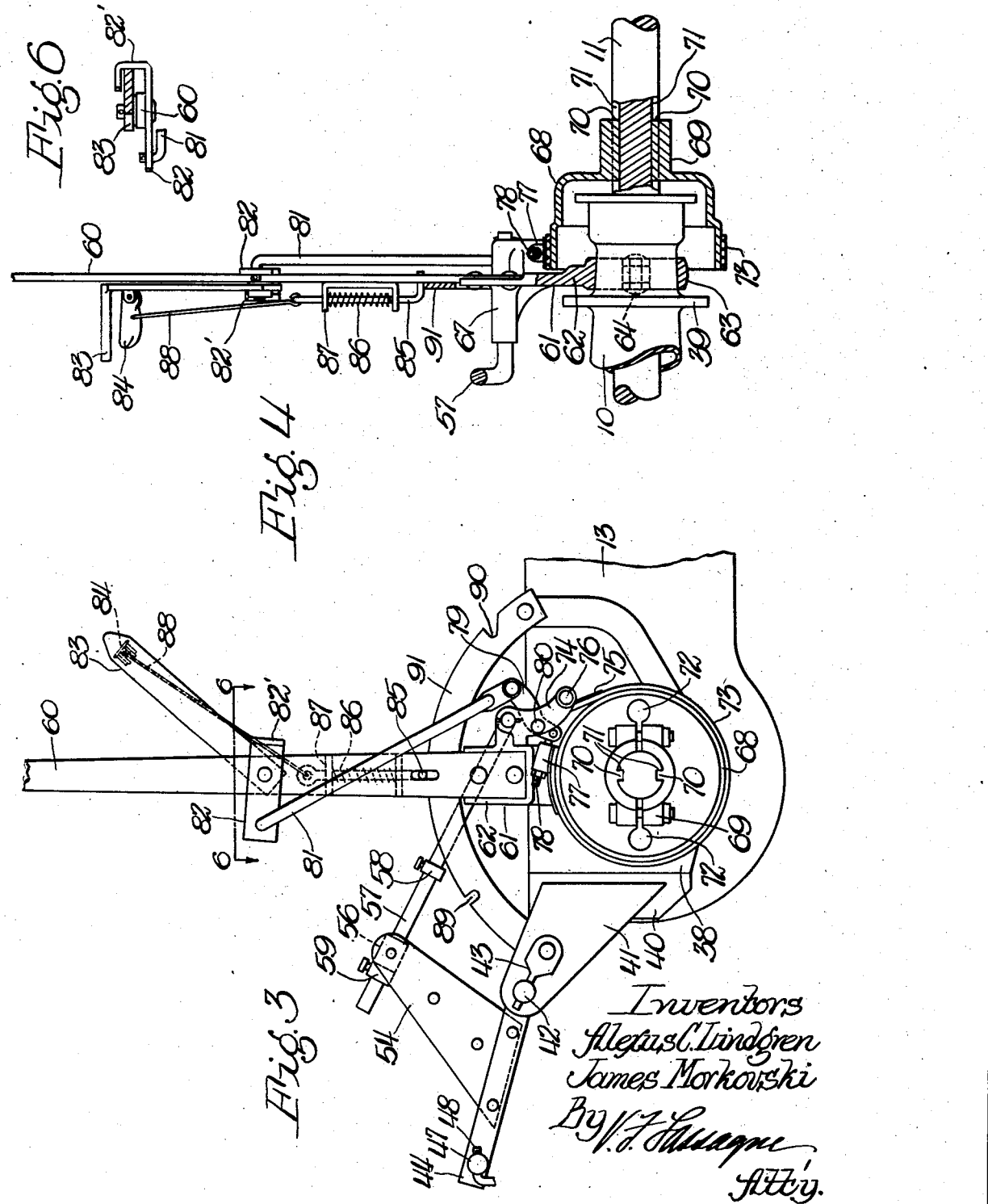

Patented Mar. 1, 1938

2,109,669

UNITED STATES PATENT OFFICE 2,109,669

PLOW ATTACHMENT FOR TRACTORS

Alexus C. Lindgren, Chicago, and James Morkovski, Canton, Ill., assignors to International Harvester Company, a corporation of New Jersey Application May 9, 1936, Serial No. 78,800

15 Claims. (Cl. 97—50)

The present invention relates to tractor carried plows and, more particularly, to structure for connecting a plow gang or gangs to a tractor and also to mechanism for raising and lowering the plow gangs.

The main objects of the invention are to provide a simplified, close coupled type of connecting means for tractor gang plows; to provide for maintaining a constant depth of plowing unaffected by movements of the tractor over rough ground; and to provide for balancing of the draft forces and, in addition, to provide for raising and lowering of the plows from operating to transporting position.

More specifically, the object of the invention is to provide a two-way gang plow attachment having the advantages stated and permitting the use of single bottom gang units in close coupled relation between the traction wheels of a so-called row crop tractor of the type having a high frame and rear axle structure on which lifting and lowering mechanism for the plows is located.

Another object of the invention is to provide structure in which the attached gang units may be separately raised by the forward travel of the tractor through friction operated lifting mechanism.

Other minor objects and advantages will become apparent to those skilled in the art from the detailed description of the preferred embodiment of the invention which follows.

The invention accordingly resides in the combination and details of construction hereinafter described and claimed and illustrated in the accompanying drawings, wherein:

Figure 3 is an enlarged detailed view of the frictional lifting mechanism of Figure 1;

Figure 4 is a rear end view of Figure 3 and shown partly in section;

Figure 5 is a detailed, enlarged view of the lifting lever connection to the axle of the tractor; and, Figure 6 is a sectional view on line 6—6 of Figure 3.

Figure 1:
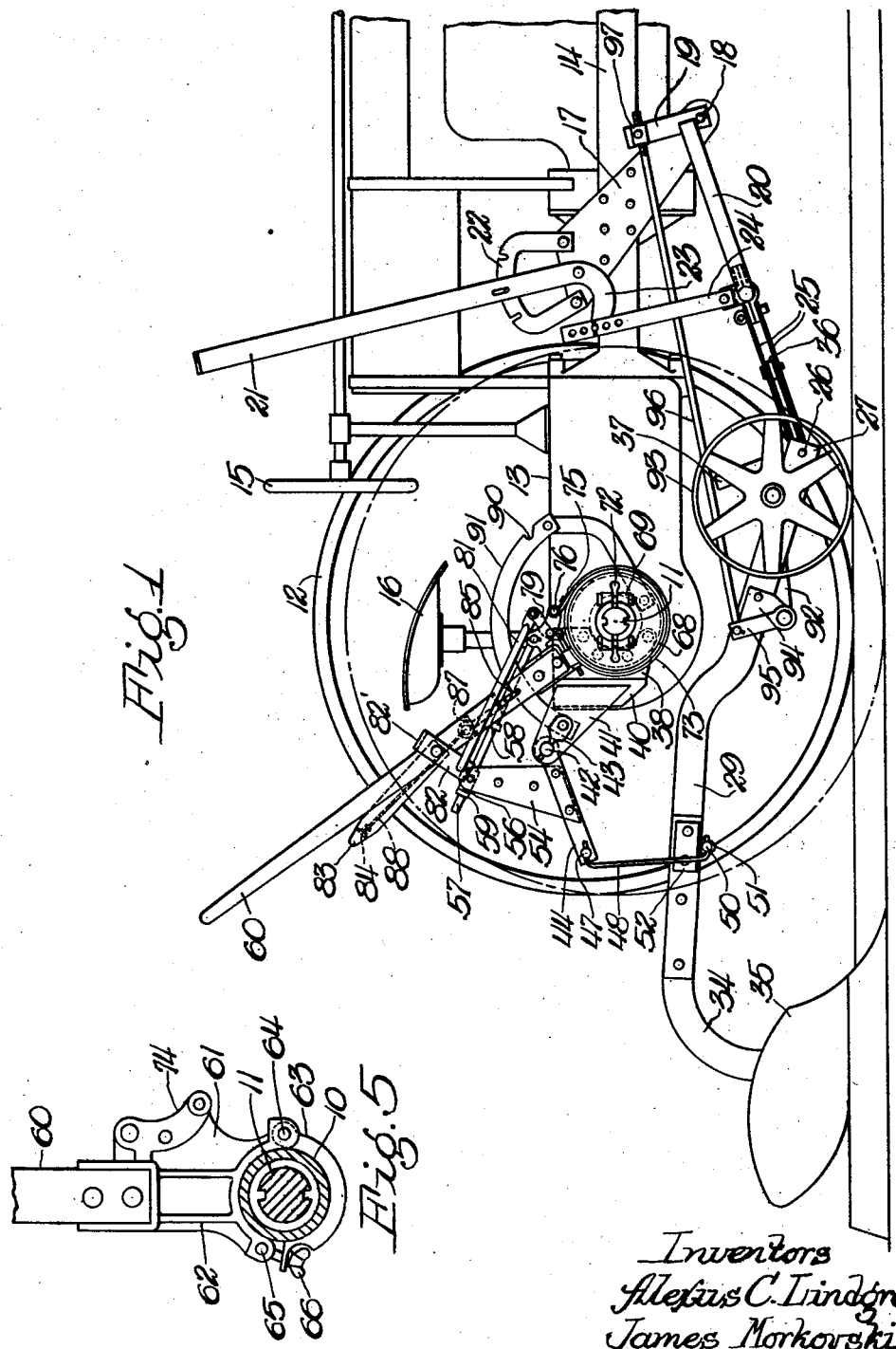
Figure 1 is a side view of the rear end of the tractor, with the right rear wheel removed showing the plow gang in lowered or plowing position and the friction lift mechanism for raising the plow.

The invention is illustrated in combination with a tractor of the type having a wide tread rear axle structure with the rear wheels adjustable thereon, as disclosed, for example, in the patent to Lindgren et al. 1,941,013, granted December 26, 1933. The tractor has a rear axle housing 10 from which the differentially driven axle shafts 11 project. The shafts 11 have the traction wheels 12 adjustably secured thereto in any suitable manner. The tractor has a forwardly extending body portion 13 including side sills 14 which extend to the front end of the tractor which is supported on dirigible steering wheels, not shown. The dirigible wheels are controlled through a steering wheel 15 located adjacent the operator's seat or station 16.

Figure 2:
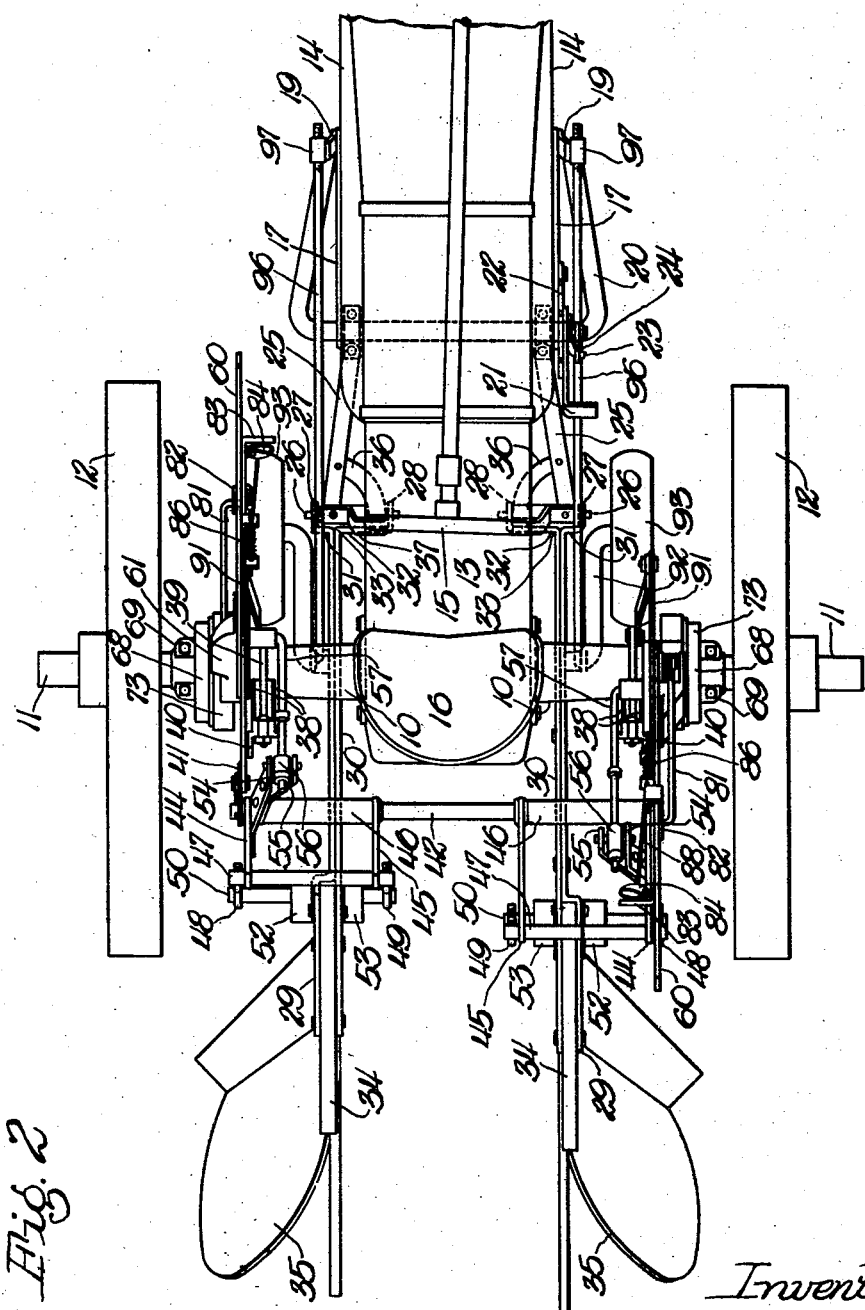
Figure 2 is a plan view of the two-way plow showing the rear end of a tractor with the plow gangs connected thereto.

In the practice of the present invention, a depending hanger member 17 is bolted, or otherwise secured, to each sill member 14 at about the middle of the tractor, as seen in Figures 1 and 2. The hanger members are preferably inclined forwardly and at their lower ends they have pivoted therein a transverse shaft 18. Welded, or otherwise secured, to the transverse shaft 18 are the upright arms 19. Welded to the upright arms 19 is a rearwardly extending U-shaped draw-bar 20. The upper ends of the upright arms 19 lie above the plane of the draw-bar proper. One of the hanger members 17, at its upper end, has mounted thereon a hand lever 21 and its locking or adjusting quadrant 22. This lever is provided with an angular, rearwardly extending arm 23, to which a supporting link 24 is adjustably connected. At its lower end the link 24 is pivotally connected to the draw-bar 20. By this arrangement movement of the lever 21 will serve to adjust the draw-bar vertically, as will be obvious.

As best seen in Figure 1, the draw-bar has pivotally connected to it at any selected point on its transverse portion a coupling link 25. As the invention is to be described in connection with a two-way plow, like parts will be denoted by similar reference characters and, as each of the plow constructions are similar with the exception of being right or left handed, as the case may be, only one plow and its structure need be described. The coupling link 25 is connected at its rear end to the draft connection 26 laterally positioned on the forward projections 27 and 28 of the longitudinally extending beam members 29 and 30. The longitudinal beam members 29 and 30 have lateral extensions 31 and 32 with the extension 32 extending inwardly more than the lateral extension 31 extends outwardly, thus forming a draft bracket 33 fixed on the inner side of the forward end of the plow beam extensions 29 and 30.

The beam extensions 29 and 30 extend under the axle housing of the tractor and are connected at their rear ends to the stub plow beam 34 which carries the usual plow bottom 35. The beam extensions 29 and 30, and stub beam 34 may be considered to constitute the implement frame, which may be adapted to carry any type of working implement. The connection between the link 25 and the bracket 33 is through the transverse pivot member 26 which has its ends supported in the forwardly extending portions 27 and 28 of the beam extensions 29 and 30. In order to provide for angular adjustment of the plow and beam, an arcuate link, or arm, 36 adjustably connects the coupling link 25 with a laterally spaced point on the member 26. The connection between the coupling link 25 and the draw-bar 20 is such as to permit free lateral and vertical movement of the plow with respect to the tractor, but the range of vertical movement of the coupling link 25, and therefore, of the forward end of the plow beam is preferably limited as by an upstanding stop or abutment member 37 carried by the member 26 in position to contact the bottom of the tractor body.

In order to raise and lower the plow from and to operating position, there is supported from the rear axle housing 10 of the tractor suitable raising and lowering mechanism. The mechanism is supported from the rear axle of the tractor by coupling members 38 in the form of horse-shoe coupling members attached to the flanges 39 integral with the axle housing 10. Supported from the coupling members 38 are the supporting brackets 40. The supporting brackets 40 are laterally spaced and connected to the flange members 39 on each axle housing extending from the longitudinal body portion 13. The supporting brackets 40 are formed so that they may be readily attached to and detached from the coupling members 38. Extending rearwardly from the supporting brackets 40 are brackets 41 welded, or otherwise secured, to the supports 40. Transversely extending across the rear end of the tractor and to the rear thereof is the transverse support 42 in the form of a rigid shaft which is secured in the brackets 41 by the keys 43 which are, in turn, attached to the support 41. Mounted on the transverse shaft 42 for angular movement are the bail members or lifting arms 44 and 45 which constitute elements of lifting and lowering means having alternate movement in opposite directions. The arms 44 and 45 are laterally spaced by the spacing member 46 which also acts to journal the arms 44 and 45 on the shaft 42.

As each of the lifting mechanisms for each plow beam of the two-way plow is the same, only one will be described and like reference characters will denote similar parts. Attached to the rear ends of the arms 44 and 45 is the transverse shaft 47 which is journaled in the arms 44 and 45. The parallel lifting links 48 and 49 are pivotally connected at their upper ends to the transverse member 47 and at their lower ends to a similar transverse member 50 which is journaled in the transverse bearing 51. The transverse bearing 51 is welded, or otherwise secured, to the supporting brackets 52 and 53 attached to the plow beam, as best shown in Figures 1 and 2. Attached to the lifting arms 44 and 45 of the right and left hand lifting mechanisms is the crank arm 54, as best shown in Figures 1, 2, and 3. Attached to the upper end of the crank arm 54 and spaced inwardly therefrom is the bracket member 55 which forms a socket in which the pivoted lost motion connection 56 is journaled by the crank arm 54 in the support bracket 55.

The actuating mechanism for raising and lowering the plow beam, which is the main object of my invention, is connected to the crank arm 54 by means of the lifting link 57 slidably mounted in the lost motion connection 56. The position of the lifting link for adjusting the depth of the plow bottom is controlled by the adjusting collars 58 and 59. The adjusting collar 58 limits the distance which the plow bottom may rise if an obstruction is encountered and may also act to put pressure upon the plow bottom. The adjusting collar 59 adjusts the maximum lifting position of the plow beam. The lifting link 57 is connected to the lifting lever 60. The lifting lever 60 is connected at its lower end to a lever bracket 61 mounted for angular motion on the axle housing 10 which may also be considered as having alternate movement in opposite directions, as best shown in Figures 5 and 6. The lever bracket 61 is composed of two parts, the upper portion 62 to which the lever 60 is connected, and the lower portion 63 which acts as a clamp to mount the bracket 61 on the axle housing 10. The lower portion 63 of the lever bracket is pivoted at 64 so that a detachable clamp is formed. The clamp portion 63 is secured to the upper portion 62 by the swinging bolt 65 pivoted in the member 62 and clamped by the wing nut 66. However, it is to be understood that the clamp portion 63 is adjusted so that the lever bracket 61 may freely swing on the axle housing 10 in a longitudinal direction. As best shown in Figure 4, the upper and lower portions 62 and 63 of the lever bracket 61, where it is journaled on the axle housing 10, conforms to the shape of the axle housing. The lifting link 57 is connected at its rear end to the crank arm 54 and at its front end it is pivotally connected to the upper portion 62 of the lever bracket, as at 67.

Attached to the axle shafts 11 is the brake drum, or pulley shaped member, 68. The brake drum 68 is clamped to the axle housing by the separate clamp collar 69, as best shown in Figure 3. The clamp collar 69 has cast integral key portions 70 which engage the key ways 71 and the axle shafts 11. The brake drum is readily clamped because of the slot portions 72 on the drum. The brake drum extends inwardly and about the axle housing 10. A brake band 73, which may be of a fibrous or metal construction, is secured at its front end to the forwardly and downwardly extending portion 74 of the upper clamp portion of the lever bracket 61. The bracket portion 74 is slotted to receive the brake band attaching bracket 75 which is pivoted on the detachable pin 76. It is to be understood that if the brake band 73 is of metal construction, it may be formed as at 75 by bending an eye and welding to form a suitable connection. The brake band 73 at its other end is connected to an adjusting lug 77 welded, or otherwise secured, to the band 73. Slidably mounted in the adjusting lug 77 is the adjusting bolt 78 having an adjusting nut abutting the lug 77. At its forward end the adjusting bolt 78 is pivotally connected to the pivoted lever 79. The pivoted lever 79 is mounted in the slotted bracket 74 by the detachable pin 80. The upper end of the pivoted lever 79 is connected to a rearwardly and upwardly extending link 81. The upper portion of the link 81 is pivoted to a lever arm in the form of a U-shaped member 82. The member 82 is pivoted on the lifting lever 60 and has an inwardly and rearwardly extending portion 82' which is engaged by the brake actuating lever 83. The brake actuating lever extends forwardly and upwardly and has the usual thumb latch 84 mounted thereon. The thumb latch 84 actuates the usual detent 85 which is spring pressed by the spring 86 mounted in the bracket 87 through which the detent 85 is slidably mounted. The bracket 87 is attached to the lever 60. The detent 85 is actuated from the thumb latch 84 by the latch rod 88. The lifting lever 60 is locked in its adjusted position by the notches 89 and 90 formed in the arcuate quadrant member 91. The notch 89 secures the lifting lever 60 in the position to which the plow is lowered for plowing position, while the notch 90 secures the lifting lever 60 when the plow is in its maximum raised position. It is to be understood that other notches may be positioned in the quadrant member 91, if necessary, for different adjusting positions.

It is, therefore, obvious that a simple mechanism has been provided for the raising and lowering of a plow beam either by a hand lever 60 or by means of the forward travel of the tractor through the brake and its accompanying mechanism for actuating the lifting arms 44 and 45 for raising and lowering the plow beams. As each lifting mechanism for each plow beam is similar, only one has been described and like reference characters denote similar parts. It is to be understood that this lifting mechanism can be used for a single one-way plow, or as it is disclosed, as best shown in Figure 2, by having separate lifting mechanism for each plow, it can readily be used for two-way plow constructions. It is to be understood that a one-way plow can be made by removing the plow construction and the accompanying lifting mechanism which is not used. However, if desired, the other plow bottom of a two-way plow can be kept in its raised position and only one plow used.

As the connections described permit free movement of the plow with respect to the tractor, it is necessary that it be supported in such a manner as to maintain a fixed plowing depth. For this purpose the forward end of the plow has journaled thereon a crank axle 92, the lower crank of which has journaled thereon a gauge wheel 93, in advance of the plow bottom 35. The upper crank or arm of this axle is journaled in suitable bracket members 94 depending from the plow beam and has secured thereto an upright arm 95. The arm 95 is connected to the upstanding arm 19 by means of a link 96, which is preferably formed at its forward end with a threaded portion adapted to be adjusted by a pivoted adjusting nut 97 mounted on the arm 19. This link, it will be seen, maintains a fixed distance between the arm 95 on the crank axle 92 and the arm 19 to which the draw-bar is attached. Therefore, when the draw-bar is adjusted upwardly by the lever 21, a pull is exerted on the link 96 and the crank axle 92 is swung downwardly, thereby lowering the gauge wheel 93 to decrease the depth of the plow. Lowering of the draft bar 20 will correspondingly raise the gauge wheel and allow the plow to go deeper. It will also be seen that when the plow is lifted for transport, the pivoting movement of the plow about its hitch will cause the arm 95 to be thrust rearwardly to some degree, as the draw-bar 20 remains stationary, thereby swinging the gauge wheel upwardly on the beam, thus affording greater clearance.

In the operation of the mechanism, best shown in Figure 3 which shows the lifting mechanism approximately half-way through its lifting position, the hand lever 60 may be used to raise and lower the plow bottom when the tractor is stopped. In order to accomplish this, the lever 60, as best shown in Figure 1, is very long to provide a large mechanical advantage when the operator raises the plow by hand. When the operator raises the plow bottoms on the forward travel of the tractor, he uses the lever 83 bringing it from its position, as shown in Figure 1, to that shown in Figure 3. The effect of this is that the lever 83 engages the pivoted lever 82 causing the link 81 to be raised upwardly which, in turn, actuates the lever connected to the brake band, thus clamping the brake band 73 on to the brake drum 68. It is, therefore, seen that the lever 60 along with its lever bracket is clamped securely to the brake drum 68 and, as the lever bracket 61 is free to turn about the axle housing and is in axial alignment with the brake drum 68, the brake drum 68 and the lever bracket 61 rotate forwardly in unison. As the lever bracket 61 rotates forwardly the lifting link 57 which is connected to the upper portion of the lever bracket moves forwardly, thus causing the lever arm 54 to which the link 57 is connected to move in a vertical plane extending longitudinally with respect to the tractor. As the lever arm 54 is connected to the raising and lowering arms 44 and 45, the alternate movement in opposite directions of the lever arms 44 and 45 is, in turn, transmitted to the plow beam through the linkages which have been previously described, thus raising the plow bottom to its transport position. When the lever arm 60 reaches the position, as shown by the notch 90, the detent 85 which has been guided by the arcuate member 91 latches into the notch 90. When the lever has reached this position, the operator releases the lever 83 and, as this does not now engage the lever 82, the tension on the brake band is released and the plow beam is left in its raised position. When the operator desires to lower the plow beam, he disengages the detent 85 from the notch 90 by actuating the thumb latch 84 and the weight of the plow bottom and beam construction causes the plow to fall by gravity into its plowing position whereupon the lever 60 is latched in its plowing position by the detent 85 and the notch 89. It is, therefore, obvious that simple mechanism has been provided in which the plow beams may be raised upon the forward travel of the tractor in approximately one-fourth of a revolution of the rear wheels. This is approximately four feet of travel of the tractor of the type herein disclosed.

It will accordingly be clear that the novel arrangement of the plow beam construction and its corresponding lifting mechanism, which has been described, provides a freely floating plow attachment including a depth gauge carried on the plow and adjustable by means of the mechanism mounted on the tractor and acting on the gauge means through vertical adjustments imparted to the draft connections between the plow and tractor. The aforesaid adjusting mechanism for the gauge means is the subject matter of a patent to A. C. Lindgren et al., 1,941,013, and is only shown here to better disclose an operable plow construction.

The specific construction herein described and illustrated is obviously capable of certain modifications without departure from the scope of the invention as defined in the following claims.

What is claimed is:

1. The combination with a tractor having axle housings and axles journaled therein, of an implement frame, means for supporting said implement frame from said axle housings, lifting means mounted on said supporting means and adapted for alternate movement in opposite directions and connected to said implement frame, a brake drum mounted on one of said axles, and means for operating said lifting means mounted on one of said axle housings adjacent said brake drum and adapted to engage said brake drum.

2. The combination with a tractor having axle housings and axles journaled therein, of an implement frame, means for supporting said implement frame from said axle housings, an arm mounted on said supporting means and adapted for alternate movement in opposite directions and connected to said implement frame, a brake drum mounted on one of said axles for rotation with said axle, and lifting means mounted on one of said axle housings adjacent said brake drum and adapted for alternate movement in opposite directions and connected to said arm, whereby upon the actuation of said lifting means the implement frame will be raised to transport position.

3. The combination with a tractor having axle housings and axles journaled therein, of an implement frame, means for supporting said implement frame from said axle housings, an arm mounted on said supporting means and adapted for alternate movement in opposite directions and connected to said implement frame, a brake drum mounted on one of said axles for rotation with said axle, and lifting means mounted on one of said axle housings adjacent said brake drum and adapted for alternate movement in opposite directions and connected to said arm, said lifting means comprising means adapted to alternate said arm by hand in opposite directions whereby the implement frame may be raised and lowered.

4. The combination with a tractor having axle housings and axles journaled therein, of an implement frame, means for supporting said implement frame from said axle housings, an arm mounted on said supporting means and adapted for alternate movement in opposite directions and connected to said implement frame, a brake drum mounted on one of said axles for rotation with said axle, and lifting means mounted on one of said axle housings adjacent said brake drum and adapted for alternate movement in opposite directions and connected to said arm; said lifting means comprising means adapted to alternate said arm by hand in opposite directions whereby the implement frame may be raised and lowered, and means mounted on said lifting means for engaging said brake drum whereby the implement frame may be raised upon the movement of said axle.

5. The combination with a tractor having axle housings and axles journaled therein, of an implement frame, means for supporting said implement frame from said axle housings, an arm mounted on said supporting means and adapted for alternate movement in opposite directions and connected to said implement frame, a brake drum mounted on one of said axles for rotation with said axle, and lifting means mounted on one of said axle housings adjacent said brake drum for oscillation and connected to said arm, said lifting means comprising means adapted to oscillate said lifting means by hand whereby the implement frame may be raised and lowered.

6. The combination with a tractor having axle housings and axles journaled thereon, of an implement frame, means for supporting said implement frame from said axle housings, an arm mounted on said supporting means and adapted for alternate movement in opposite directions and connected to said implement frame, a brake drum mounted on one of said axles for rotation with said axle, and lifting means mounted on one of said axle housings adjacent said brake drum for oscillation and connected to said arm; said lifting means comprising means adapted to oscillate said lifting means by hand whereby the implement frame may be raised and lowered, and means mounted on said lifting means for engaging said brake drum whereby the implement frame may be raised upon the movement of said axle.

7. The combination with a tractor having axle housings and axles journaled therein, of a two-way implement comprising implement frames adapted to be in alternate positions, means for supporting said implement frames from the tractor, lift arms mounted on said supporting means and adapted for alternate movement in opposite directions and connected to said implement frames, a plurality of lifting means laterally spaced on said axle housings and connected to said lift arms, a brake drum mounted on each axle shaft for rotation with said axle shaft, each of said lifting means mounted adjacent each of said brake drums for alternate movement in opposite direction, and said lifting means comprising means whereby each of said implement frames may be alternately raised and lowered by hand.

8. The combination with a tractor having axle housings and axles journaled therein, of a two-way implement comprising implement frames adapted to be in alternate positions, means for supporting said implement frames from the tractor, lift arms mounted on said supporting means and adapted for alternate movement in opposite directions and connected to said implement frames, a plurality of lifting means laterally spaced on said axle housings and connected to said lift arms, a brake drum mounted on each axle shaft for rotation with said axle shaft, each of said lifting means mounted adjacent each of said brake drums for alternate movement in opposite directions, said lifting means comprising means whereby each of said implement frames may be alternately raised and lowered through said lift arms, and means mounted on said lifting means for engaging said brake drum whereby the implement frame may be raised upon the movement of said drum.

9. In a lifting and lowering mechanism for a tractor having a power actuated rotating member journaled coaxially with a stationary supporting member, the combination with a pulley member mounted on said rotating member, of lifting means, said lifting means mounted coaxially with said pulley member and adjacent thereto, friction means mounted on said lifting means and adapted to engage said pulley member, and actuating means mounted on said lifting means for actuating the friction means, said actuating means comprising a plurality of interconnected linkages, and a lost motion connection for actuating the linkages whereby the friction means is caused to engage the pulley member.

10. In a lifting and lowering mechanism for a tractor having a power actuated rotating member journaled coaxially with a stationary supporting member, the combination with a pulley member mounted on said rotating member, of lifting means, said lifting means mounted on said stationary member, latching means adjacent said lifting means for securing said lifting means in adjusted position, friction means mounted on said lifting means and adapted to engage said pulley member, and actuating means mounted on said lifting means for actuating the friction means, said actuating means comprising a plurality of interconnected linkages, and means for engaging the aforesaid latching means for locking the lifting means in adjusted position.

11. In a lifting and lowering mechanism for a tractor having a power actuated rotating member journaled coaxially with a stationary supporting member, the combination with a pulley member mounted on said rotating member, of lifting means, said lifting means mounted for alternate movement in opposite directions with respect to said pulley member, friction means mounted on said lifting means and adapted to engage said pulley member, said lifting means comprising a lifting lever, latching means for said lifting means comprising a stationary locking member, and a latching member mounted on said lifting lever, means for actuating the friction means whereby the friction means engages the pulley member, and means for actuating the aforesaid latching member mounted on the means for actuating the friction means.

12. In a lifting and lowering mechanism for a tractor having a power actuated rotating member journaled coaxially with a stationary supporting member, the combination with a pulley member mounted on said rotating member, of lifting means, said lifting means mounted for oscillatory motion with respect to said pulley member, said lifting means mounted coaxially with said rotating member, friction means mounted on said lifting means comprising a band member for encircling said pulley member, one end of said band member connected to said lifting means, and means for actuating said friction means having the other end of said band member connected thereto.

13. In a lifting and lowering mechanism for a tractor having a power actuated rotating member journaled coaxially with a stationary supporting member, the combination with a pulley member mounted on said rotating member, of lifting means, said lifting means mounted for oscillatory motion with respect to said pulley member, said lifting means mounted coaxially with said rotating member, friction means mounted on said lifting means comprising a band member for encircling said pulley member, one end of said band member connected to said lifting means, means for actuating said friction means, and adjustable means connecting the other end of said band member to the means for actuating the friction means.

14. In a lifting and lowering mechanism for a tractor having a power actuated rotating member journaled coaxially with a stationary supporting member, the combination with a pulley member mounted on said rotating member, of lifting means, said lifting means mounted for oscillatory motion with respect to said pulley member, said lifting means mounted coaxially with said rotating member, friction means mounted on said lifting means comprising a band member for encircling said pulley member, and means for actuating said friction means comprising a plurality of interconnected linkages and a lost motion means for actuating said linkages.

15. In a lifting and lowering mechanism for a tractor having a power actuated axle journaled in an axle housing, the combination with a detachable pulley member mounted on said axle, of lifting means, said lifting means mounted for oscillatory motion with respect to said pulley member and coaxially with said axle, means for detachably mounting said lifting means on said axle housing, friction means mounted on said lifting means for engaging said pulley member, means mounted on said lifting means whereby said lifting means may be adjusted by hand, and additional means mounted on said lifting means for actuating said friction means whereby said lifting means may be actuated by said power actuated axle.

ALEXUS C. LINDGREN.
JAMES MORKOVSKI.